(12) United States Patent
Atif et al.

(10) Patent No.: US 11,769,610 B2
(45) Date of Patent: Sep. 26, 2023

(54) DEVICE FOR LOCALLY FLARING A BRAIDED TUBULAR STRUCTURE

(71) Applicant: TE Connectivity Morocco SARL, Port Tanger Med (MR)

(72) Inventors: Zouheir Atif, Barcelona (ES); Saad Boughaba, Tangier (MR)

(73) Assignee: TE Connectivity Morocco Sarl, Port Tanger (MA)

( * ) Notice: Subject to any disclaimer, the term of this patent is extended or adjusted under 35 U.S.C. 154(b) by 0 days.

(21) Appl. No.: 17/231,457

(22) Filed: Apr. 15, 2021

(65) Prior Publication Data

US 2021/0327613 A1    Oct. 21, 2021

(30) Foreign Application Priority Data

Apr. 15, 2020   (EP) .................................... 20169633

(51) Int. Cl.
*H01B 13/00*    (2006.01)
*H01R 43/28*    (2006.01)

(52) U.S. Cl.
CPC ......... *H01B 13/0036* (2013.01); *H01R 43/28* (2013.01); *Y10T 29/5313* (2015.01)

(58) Field of Classification Search
CPC .. H02G 1/1224; H02G 1/1265; H02G 1/1297; H02G 1/1239; H02G 1/127; H01R 43/05; Y10T 29/514; Y10T 29/49117; Y10T 29/49123; Y10T 29/5313; H01B 13/0036

USPC ... 29/729, 564.4, 566.1, 745, 760, 761, 825, 29/828, 829, 867
See application file for complete search history.

(56) References Cited

U.S. PATENT DOCUMENTS

| 4,719,697 A | 1/1988 | Schwartzman et al. |
| 10,840,680 B2 * | 11/2020 | Houser ................ H02G 1/1265 |
| 11,056,852 B2 * | 7/2021 | Houser ................ H02G 1/1297 |

FOREIGN PATENT DOCUMENTS

WO    2019092681 A1    5/2019

OTHER PUBLICATIONS

European Search Report, dated Aug. 10, 2020, 8 pages.

* cited by examiner

*Primary Examiner* — Thiem D Phan
(74) *Attorney, Agent, or Firm* — Barley Snyder

(57) ABSTRACT

A device for flaring an end section of a braided tubular structure of an electrical conductor defines a reception volume having a peripheral boundary for receiving the end section of the braided tubular structure. The device further includes one or more rotatable rollers of which each has at least one peripheral roller surface facing the peripheral boundary of the reception volume. The one or more rollers are adapted to move relative to the reception volume in a peripheral direction about the reception volume for flaring the end section.

18 Claims, 6 Drawing Sheets

DEVICE FOR LOCALLY FLARING A BRAIDED TUBULAR STRUCTURE

CROSS-REFERENCE TO RELATED APPLICATIONS

This application claims priority under 35 U.S.C. § 119 to European Patent Application No. 20169633.3, filed Apr. 15, 2020.

FIELD OF THE INVENTION

The present invention relates to a device for flaring braided tubular structures, and more specifically, to a device for flaring a shield of one or more electrical conductors.

BACKGROUND

Numerous applications in the field of automotive engineering and in other technical fields rely on data being transmitted in the form of electrical signals via electrical conductors acting as a signal path for the electrical signals. To ensure sufficient signal transmission quality, shielded coaxial cables are usually deployed. Typically, the electrical conductors constitute a center core and are circumferentially surrounded by a tubular shield made from braided strands of copper wire or other kinds of metal wire. The shield functions based on the principle of a Faraday cage, protecting the electrical signals from external electrical noise and preventing the electrical signals from causing electromagnetic interference within surrounding components. In order to prevent direct contact of the electrical conductors with the shield, a dielectric insulator is interposed in between. Optionally, a layer of metal foil e.g., aluminum foil, may be situated between the dielectric insulator and the shield, the metal foil reflecting back internal and external electromagnetic radiation according to the so-called mirror effect.

At the source and/or destination of the electrical signals, suitable interfaces, such as plug connectors, may be used to connect the electrical conductors with components upstream and/or downstream of the signal path. In the case of shielded coaxial cables, the shield is radially distanced from the center core and the dielectric insulator is partially removed to make the center core accessible. Further, the shield needs to be connected to the interfaces, e.g., to a ground contact of the interface, in order to be effective. In certain applications, removal of the metal foil is necessary prior to the connection of the shield to the interface.

Accordingly, there is a need for improved devices and associated methods for evenly and effortlessly flaring the shield, preferably without damaging the strands of the shield itself and the metal foil.

SUMMARY

In one embodiment of the present disclosure, a device for flaring an end section of a braided tubular structure of an electrical conductor is provided. The device defines a reception volume having a peripheral boundary and which is adapted to receive the end section of the braided tubular structure. The device further includes one or more rotatable rollers of which each has at least one peripheral roller surface facing the peripheral boundary of the reception volume. The one or more rollers are adapted to move relative to the reception volume in a peripheral direction about the reception volume for flaring the end section.

BRIEF DESCRIPTION OF THE DRAWINGS

The invention will now be described by way of example with reference to the accompanying Figures, of which.

DETAILED DESCRIPTION OF THE EMBODIMENTS

Figure 1:
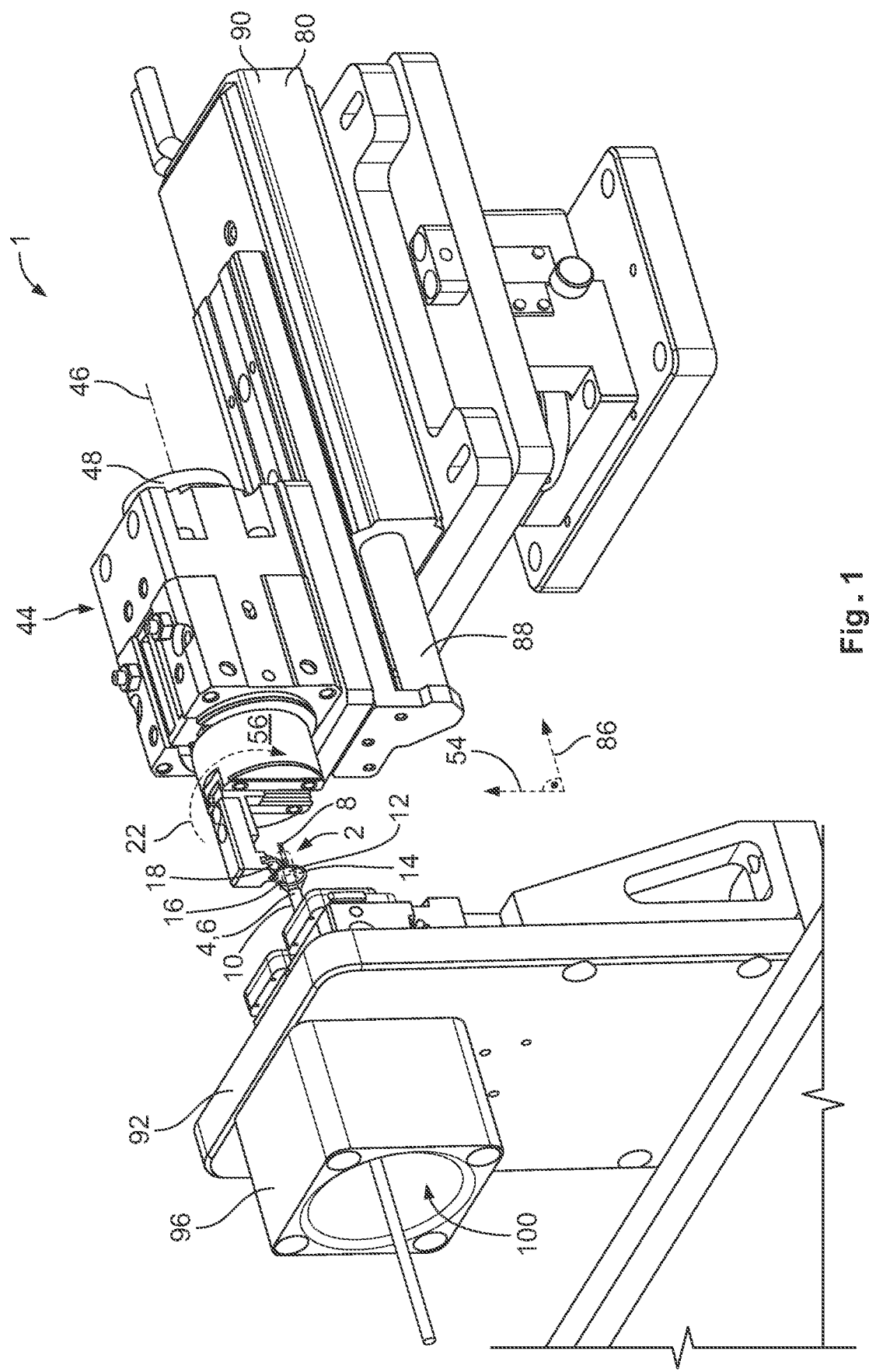
FIG. 1 shows a schematic representation of a perspective view of a device comprising one roller according to one embodiment of the present disclosure.

Technical solutions of the present disclosure will be described hereinafter in detail through embodiments and with reference to the attached drawings. In the specification, the same or the like reference numerals refer to the same or the like elements. The illustration of the embodiments of the present disclosure made with reference to the attached drawings is aimed to explain the general inventive concept of the present disclosure, not to be construed as a limitation of the present disclosure.

In addition, in the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

In the following, the structure of possible embodiments of a device 1 for flaring an end section 2 of a braided tubular structure 4, such as a shield 6 of an electric conductor 8 or cable 10, according to the present invention is explained with reference to the exemplary embodiments shown in FIGS. 1 through 6. Further, FIGS. 1 through 6 are used for explaining the associated methods according to the present invention.

FIG. 1 shows a perspective view of the device 1 according to one possible embodiment of the present disclosure, the device 1 defines a reception volume 12 which has e.g., a cylindrical, peripheral boundary 14 and is adapted to receive the end section 2 of the braided tubular structure 4. In particular, the reception volume 12 may be defined in such a way that the peripheral boundary 14 of the reception volume 12 preferably exactly coincides with an outer circumferential surface 16 of the braided tubular structure 4 once the end section 2 of the braided tubular structure 4 is received within the reception volume 12.

The device 1 may further comprise one or more rollers 18 of which each has at least one peripheral roller surface 20 (see FIG. 3) at least partially facing the peripheral boundary 14 of the reception volume 12 and each is adapted to move relative to the reception volume 12 in a peripheral direction 22 about the reception volume 12. Upon definition of the reception volume 12, the one or more rollers 18 may be specifically adapted to trace the peripheral boundary 14 of the reception volume 12. In particular, the one or more rollers 18 may move relative to the reception volume 12 in the peripheral direction 22, while the at least one peripheral roller surface 20 of each of the one or more rollers 18 borders the peripheral boundary 14 of the reception volume 12.

Because the outer circumferential surface 16 of the braided tubular structure 4 coincides with the peripheral boundary 14 of the reception volume 12, the one or more rollers 18 may engage in rolling contact with the outer circumferential surface 16 of the braided tubular structure 4 received within the reception volume 12. When the one or more rollers 18 roll over the outer circumferential surface 16 of the braided tubular structure 4 at the end section 2 of the braided tubular structure 4, individual strands of the braided tubular structure may successively be untangled. This gradually leads to the intended flaring of the braided tubular structure 4, while only minimal to no normal force is exerted on the outer circumferential surface 16 of the braided tubular structure 4.

In FIG. 1, the device 1 is shown with exactly one roller 18. This embodiment may be utilized when the to-be-flared braided tubular structure 4 is relatively stiff and may support its own weight as well as any normal force exerted on the outer circumferential surface 16 of the braided tubular structure 4 by the one roller 18.

According to the geometric dimensions and material characteristics of the to-be-flared braided tubular structure 4, additional stabilization may be necessary. For this stabilization, the device 1 may comprise more than one e.g., two, three, four, five, six or even more rollers 18. As exemplarily shown in FIGS. 2 through 6, the device 1 may comprise three rollers 18.

Hereinafter and for the sake of brevity, when referring to each roller 18, it shall be understood that each of the one or more rollers 18 is meant, unless specified otherwise. Accordingly, when referring to all rollers 18, it shall be understood that all of the one or more rollers 18 are meant, unless otherwise specified.

Figure 2:
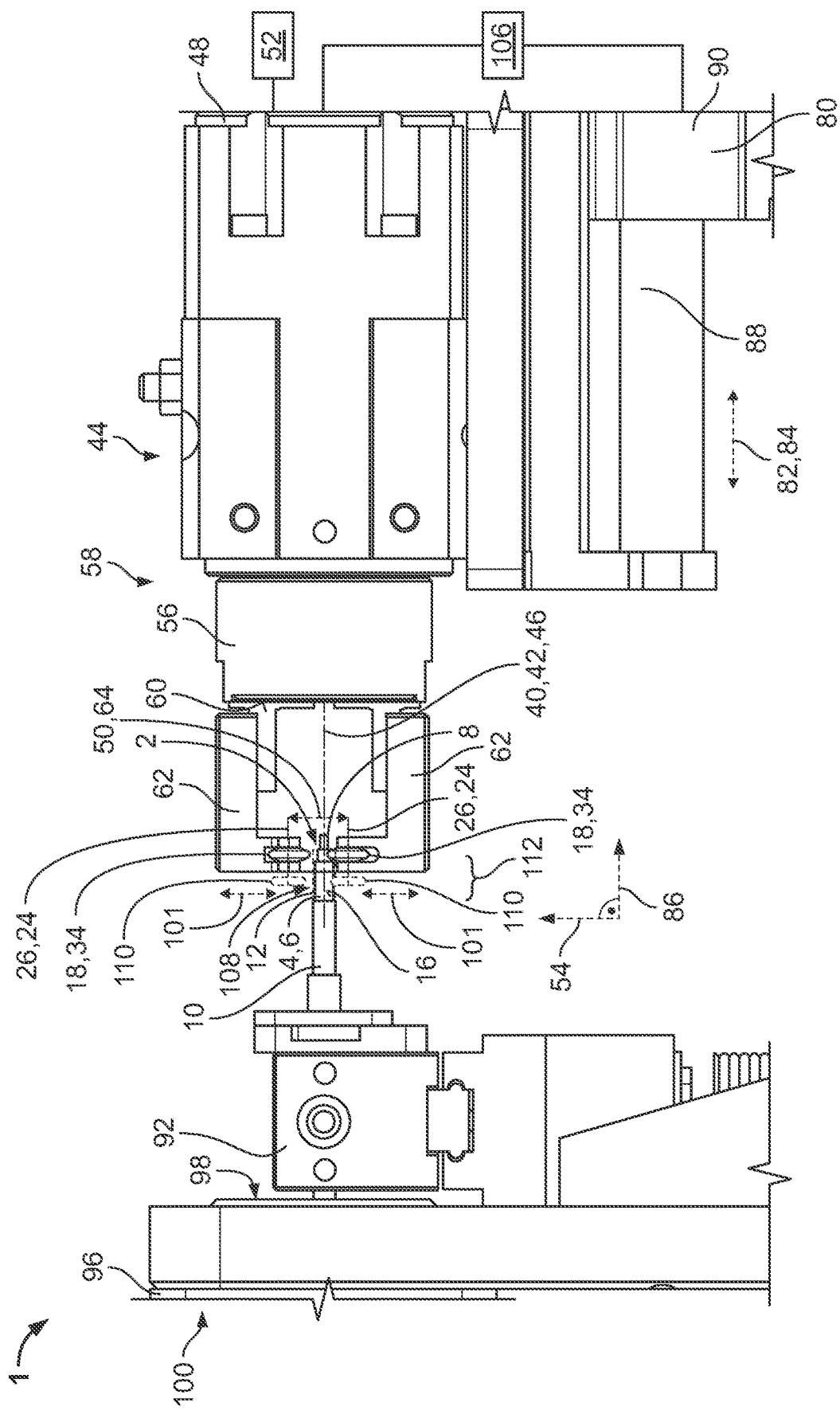
FIG. 2 shows a schematic representation of a side view of the device comprising three rollers according to one embodiment.
Figure 3:
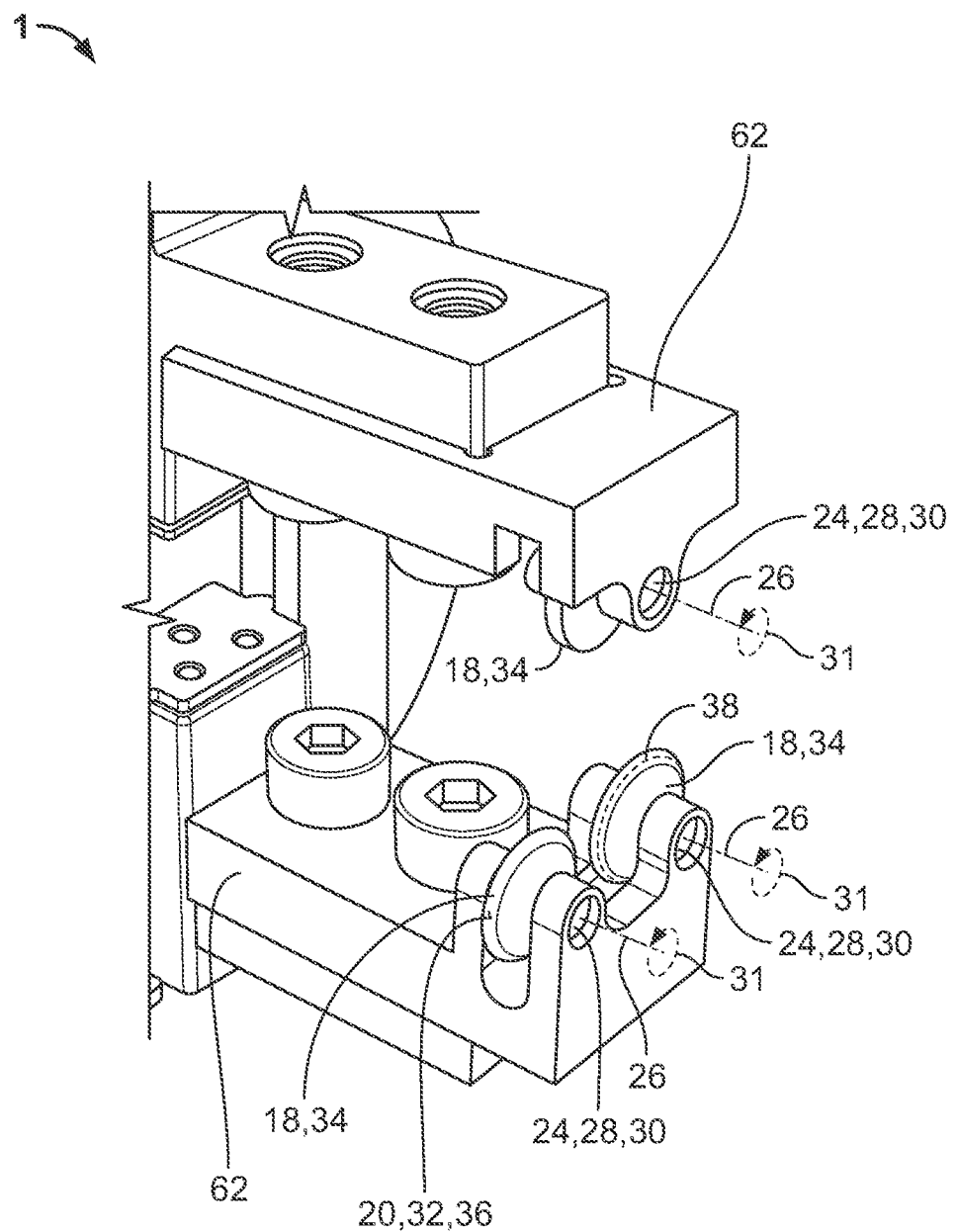
FIG. 3 shows a schematic representation of a partially enlarged perspective view of the device comprising three rollers according to another embodiment.

As can be seen from FIGS. 2 and 3, each roller 18 may have a roller axle 24 extending coaxially with a symmetry axis 26 of the respective roller 18. Each roller 18 may be adapted to rotate about its roller axle 24. In the shown embodiment of FIG. 3, the roller axle 24 of each roller 18 is a rotating axle 28 monolithically connected with the respective roller 18 and protruding therefrom as cylindrical projections 30. Alternatively, the roller axle 24 may be a stationary axle penetrating the respective roller as a separate structural element. In both cases, the roller axles 24 may be utilized to rotatably hold the respective roller 18 in the device 1. It is to be understood that the term axle also covers pins, shafts and other types of fixed beams with bearings at their ends about which the respective roller 18 may be adapted to rotate.

In another alternative embodiment, the roller axles 24 may be constituted by imaginary axes merely defining an orientation of the roller's rotation. The device may comprise at least one cage (not shown) for rotatably holding each roller 18 in such an embodiment.

The roller axles 24 of all rollers 18 may be parallel to each other. Alternatively, all roller axles 24 may be arranged in a conical configuration i.e., all roller axles 24 may be distributed, preferably evenly, on a surface of an imaginary conical shape (not shown).

Further in FIG. 3, it can be seen that the at least one peripheral roller surface 20 of each roller 18 may extend about the symmetry axis 26 and subsequently also about the roller axle 24 of the respective roller 18. Preferably, the at least one peripheral roller surface 20 of each roller 18 may continuously extend in a circumferential direction 31 with respect to the roller axle 24 of the respective roller 18 forming a closed, rotationally symmetrical surface 32.

Still referring to FIG. 3, each roller 18 is shaped as a disc 34, wherein the at least one peripheral roller surface 20 corresponds with a peripheral surface 36 of the disc 34. As is further shown, the at least one peripheral roller surface 20 of each roller 18 is convexly formed having an equatorial line 38 extending on a plane perpendicular to the roller axle 24 of the respective roller 18. Alternatively, the one or more rollers 18 may also have a cylindrical, spherical, conical or any other rotationally symmetrical shape.

Figure 4:
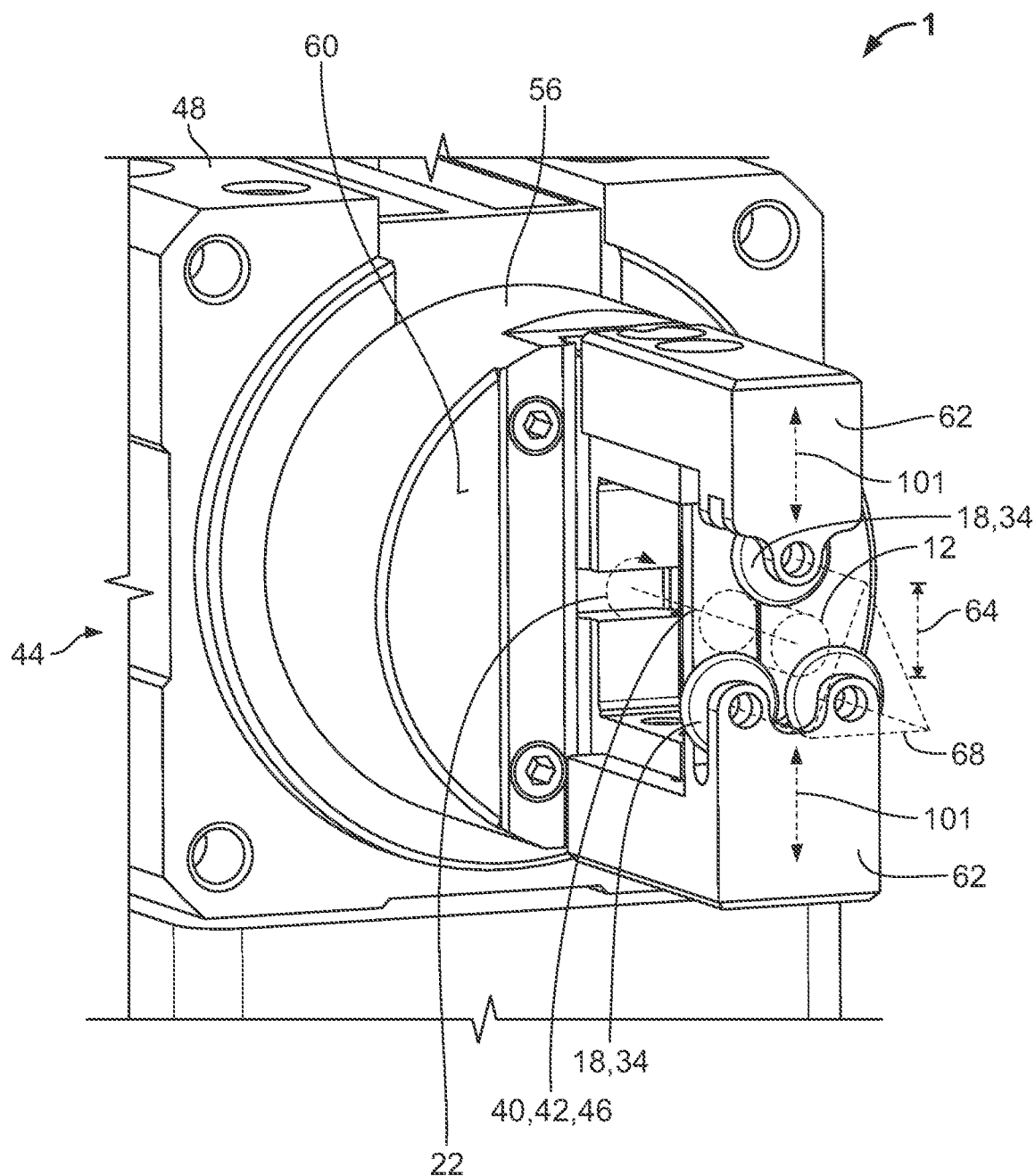
FIG. 4 shows a schematic representation of a partially enlarged perspective view of the device comprising three rollers according to another embodiment.

As is indicated in FIG. 4, each roller 18 may be adapted to revolve around the reception volume 12 about an axis of revolution 40. The axis of revolution 40 may extend through the reception volume 12, preferably coaxially with a center line 42 of the reception volume 12. In particular, each roller 18 can thus be moved along a circular path in a tangential direction respect to the braided tubular structure 4 when the braided tubular structure 4 is received within the reception volume 12.

More specifically, the device 1 may comprise at least one spindle 44 (see FIG. 1) having a rotational axle 46 extending coaxially with the axis of revolution 40. The device 1 may further comprise a rotational drive 48 adapted to move each roller 18, preferably automatically, in the peripheral direction 22 about the reception volume 12. In particular, the rotational drive 48 may turn the at least one spindle 44.

Each roller 18 may be mounted, preferably slidably, on the at least one spindle 44 and spaced apart from the axis of revolution 40 (see FIG. 2). Here, the axis of revolution 40 may be configured parallel to the roller axle 24 of each roller 18. Alternatively, the roller axle 24 of each roller 18 may be oblique with respect to the axis of revolution 40.

At least two rollers 18 of the device 1 may be held at an adjustable distance 50 from one another (see FIG. 2), the distance adjustment being possible prior to and during operation of the device 1. The device 1 may further comprise a distance control unit 52 for manipulating and controlling the adjustable distance 50 between the at least two rollers 18 held at the adjustable distance 50.

At least one roller 18 of the device 1 may be adapted to move in a radial direction 54 with respect to the reception volume 12. Thereby, the respective roller 18 can be moved away from the reception volume 12 in order to clear access to the reception volume 12. This facilitates the insertion of the end section 2 of the braided tubular structure 4 into the reception volume 12.

Once the end section 2 of the braided tubular structure 4 is received within the reception volume 12, the respective roller 18 can be moved towards the reception volume 12 and brought into contact with the outer circumferential surface 16 of the braided tubular structure 4. For this, the at least one spindle 44 may comprise a cylindrical chuck 56, which is attached to an end 58 of the at least one spindle 44. On a front face 60 of the cylindrical chuck 56 at least one jaw 62 may be slidably mounted, wherein each roller 18 is rotatably mounted on the at least one jaw 62. Particularly, the at least one jaw 62 may be oriented to move each roller 18 radially relative to the reception volume 12.

As is indicated in FIGS. 2 and 4 with dashed arrows 101, preferably all rollers 18 are adapted to move in the radial direction 54. Accordingly, the device 1 may comprise at least two jaws 62 arranged oppositely with respect to the reception volume 12 on the front face 60 of the cylindrical chuck 56. Each roller 18 may be rotatably mounted on one of the at least two jaws 62, wherein the distance 64 between the at least two jaws 62 may be adjustable e.g., by means of the above distance control unit 52.

In an embodiment of the device 1 comprising three rollers 18, the above distance control unit 52 may be utilized to manipulate and control the distance 66 (see FIG. 5) between the reception volume 12 and the at least one peripheral roller surface 20 of the respective rollers 18 in such a way that the three rollers 18 may have their respective roller axles 24 each extend through one corner of an imaginary isosceles triangle 68 before distance adjustment (see FIG. 4). After distance adjustment, the three rollers 18 may have their respective roller axles 24 each extend through one corner of an imaginary equilateral triangle (not shown).

Figure 5:
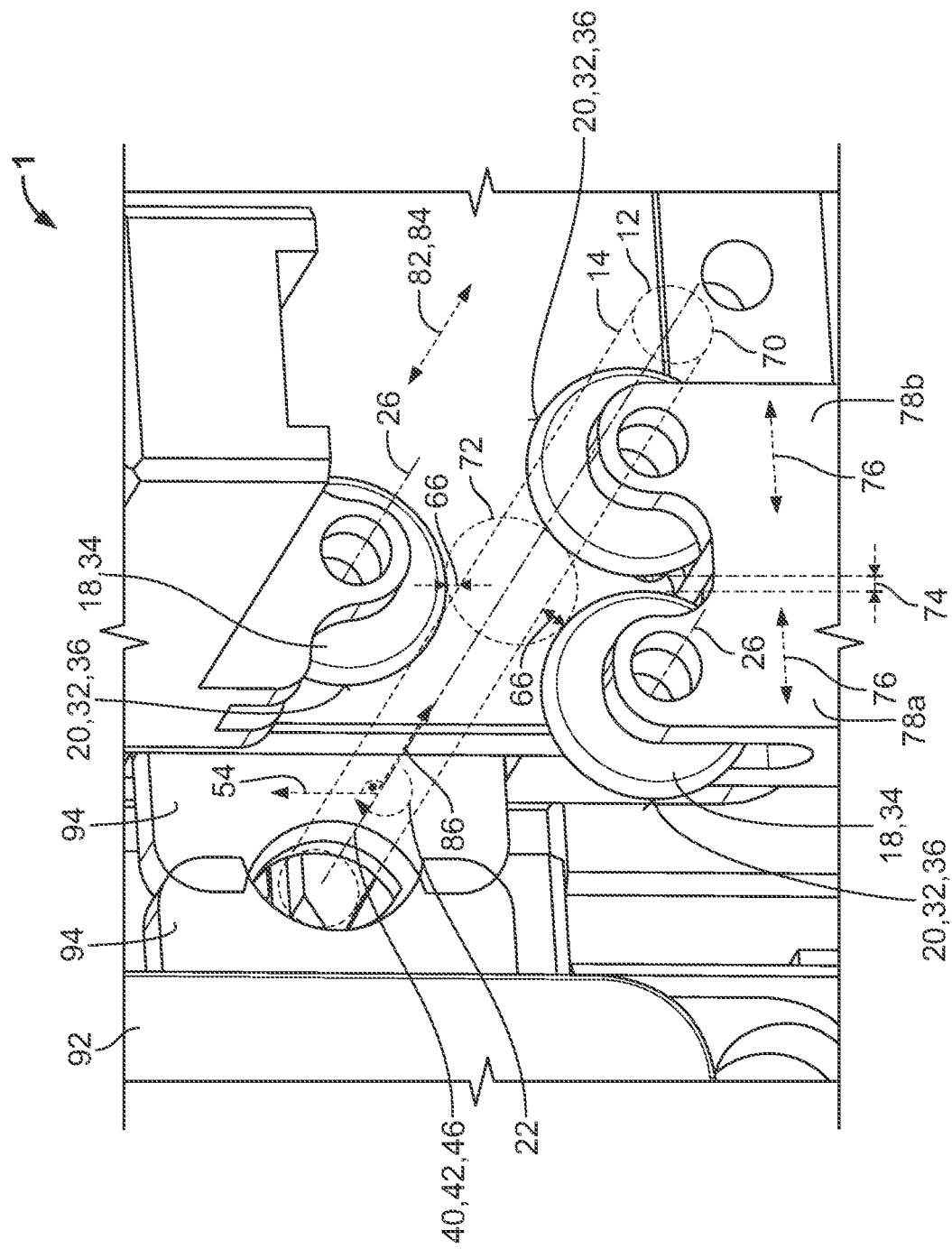
FIG. 5 shows a schematic representation of a partially enlarged perspective view of the device comprising three rollers according to yet another embodiment.

Moving to FIG. 5, it can be seen that in a cross-section of the reception volume 12, the cross section being perpendicular to the center line 42 of the reception volume 12, the reception volume 12 may exhibit a closed circumference 70. Each roller 18 may be adapted to move relative to the reception volume 12 along a segment of the closed circumference 70 of the reception volume 12. Alternatively, each roller may be adapted to move relative to the reception volume 12 along the entire closed circumference 70 of the reception volume 12.

As further shown in FIG. 5, the three rollers 18 may be distributed in a circular arrangement around the reception volume 12. In the shown circular arrangement, each point on the at least one peripheral roller 5 surface 20 of the respective roller 18, which is most proximal to the reception volume 12, is situated on an imaginary circle 72 surrounding the reception volume 12. Preferably, the imaginary circle 72 coincides with the above closed circumference 70 of the reception volume 12 and/or the three rollers 18 are evenly distributed on the imaginary circle 72. The even distribution on the imaginary circle 72 of the three rollers 18 corresponds with the configuration described above where the three rollers 18 may have their respective roller axles 24 each extend through one corner of the equilateral triangle (not shown). Alternatively, in an embodiment of the device 1 with two rollers (not shown), the two rollers may be arranged on opposite sides of the reception volume 12. In an embodiment of the device 1 with a higher even number of rollers, the rollers may be pairwise arranged on opposite sides with respect to the reception volume 12

On at least one jaw 62, at least two rollers 18 may be rotatably mounted (see FIGS. 3 to 5). Optionally, a distance 74 between the at least two rollers 18 may be adjustable prior to and during operation of the device 1 e.g., by means of the above distance control unit 52. This is exemplarily indicated by dashed arrows 76 in FIG. 5. In particular, the at least one jaw 62 may be constituted by two separate halves 78a, 78b, which are movable relative to each other.

Referring again to FIGS. 1 and 2, the device 1 may further comprise a displacement mechanism 80 for guiding a relative movement 82 between the reception volume 12 and each roller 18. The relative movement 82 is preferably a translational movement 84 parallel to the center line 42 of the reception volume 12. In this way, the relative movement 82 may take place in an axial direction 86 with respect to the reception volume 12 and the braided tubular structure 4 received within the reception volume 12. In particular, the displacement mechanism 80 may comprise a linear slider 88 on which all rollers are mounted, directly or indirectly.

Further, the displacement mechanism 80 may comprise a linear drive 90 adapted to move each roller 18, preferably automatically, relative to the reception volume 12 e.g., in the axial direction 86 with respect to the reception volume 12.

The device 1 may further comprise at least one holding mechanism 92 adapted to e.g., temporarily fixate the braided tubular structure 4 relative to each roller 18 and adapted to position the end section 2 of the braided tubular structure 4 within the reception volume 12, preferably coaxially with the reception volume 12 (see FIG. 2). As is depicted in FIG. 5, the at least one holding mechanism 92 may be constituted by at least two clamps 94, which mechanically clasp the braided tubular structure 4 therebetween. Further, the holding mechanism may comprise a funnel like structure 96 having a narrower opening 98, which faces towards the at least two clamps 94, and a wider opening 100, which faces away from the at least two clamps 94. Instead of the one or more rollers 18, the at least one holding mechanism 92 may be mounted on the linear slider 88 of the displacement mechanism 80 described above.

Figure 6:
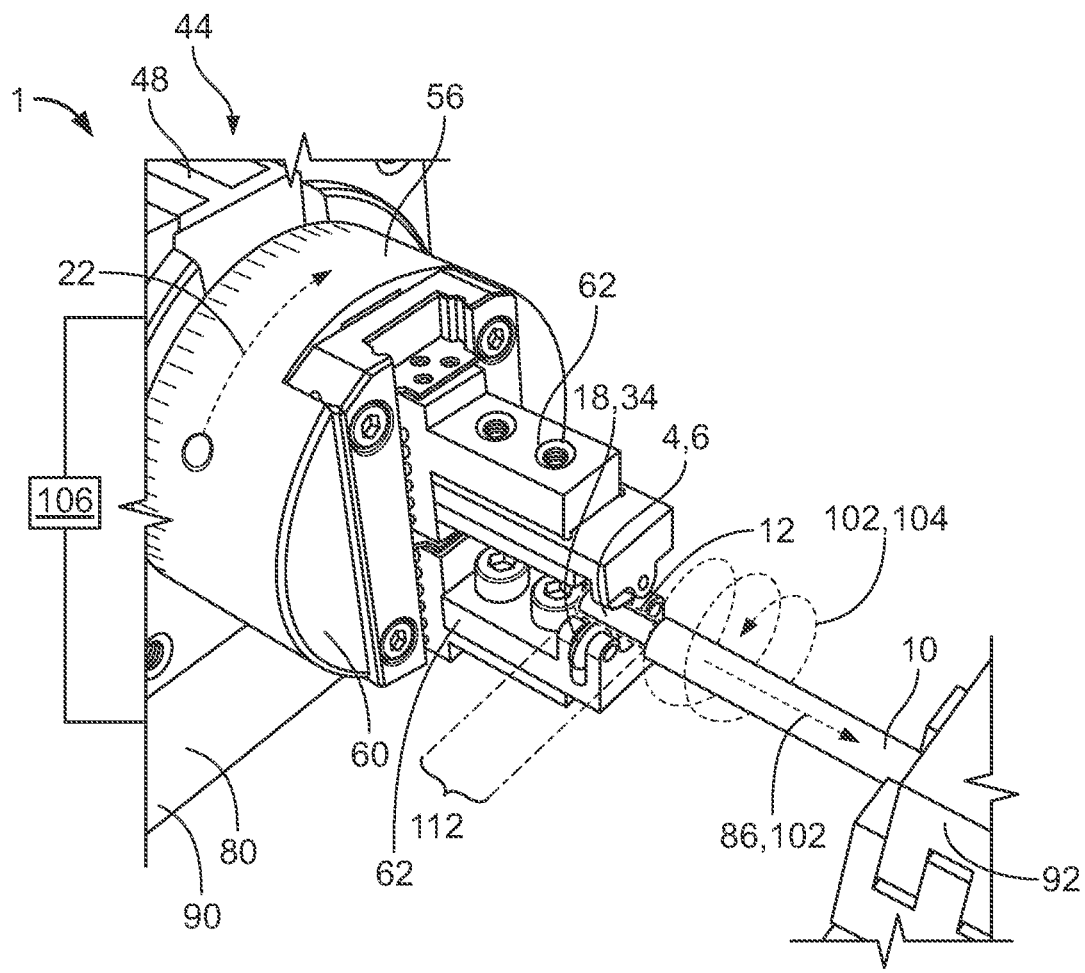
FIG. 6 shows a schematic representation of a partially enlarged perspective view of the device comprising an electronic control unit according to one embodiment.

As is indicated by a set of dashed arrows 102 in FIG. 6, the device 1 may be adapted to simultaneously move each roller 18 in the peripheral direction 22 about the reception volume 12 and in the axial direction 86 with respect to the reception volume 12, so as to move each roller 18 along a spiral or helicoidal path 104 around the reception volume 12. For this, an electrical control unit 106 may be provided in the device 1 for synchronizing the movement of the rotational drive 48 and the linear drive 90.

A method for locally flaring an end section 2 of a braided tubular structure 4, such as a shield 6 of an electric conductor 8 or cable 10 according to the present invention will be explained in reference to FIGS. 1 through 6. The method comprises the step of rolling with one or more rollers 18 over an outer circumferential surface 16 of the braided tubular structure 4 at the end section 2 of the braided tubular structure 4, preferably so as to successively untangle strands of the braided tubular structure 4 and gradually flare the end section 2 of the braided tubular structure 4. This step is depicted in FIG. 1.

As shown in FIG. 1, the method may comprise, optionally and prior to the above rolling step, the step of securing the braided tubular structure 4, preferably by means of at least one holding mechanism 92, the step of positioning the end section 2 of the braided tubular structure 4 within a reception volume 12 and the step of moving the one or more rollers 18 to a position bordering the reception volume 12. Moreover, in the above rolling step, each roller 18 may be moved relative to the reception volume 12 in a peripheral direction 22 about the reception volume 12. Preferably, the above positioning step, moving step and rolling step may be conducted within a cycle time of less than five seconds.

Subsequent to the above rolling step, the method may comprise the step of adjusting a relative position between each roller 18 and the braided tubular structure 4 received within the reception volume 12, such that each roller 18 is radially aligned with an un-flared section 108 of the braided tubular structure 4. The un-flared section 108 of the braided tubular structure 4 is characterized in that it is a section where the one or more rollers 18 have not yet rolled over. For example, the un-flared section 108 of the braided tubular structure 4 may be adjacent to the end section 2 of the braided tubular structure 4. This adjustment step is depicted in FIG. 2 by dashed contour lines 110 of each roller 18 symbolizing the location into which the respective roller 18 will be moved subsequently.

The above adjusting step may be followed by the step of rolling with each roller 18 over the outer circumferential surface 16 of the braided tubular structure 4 at the un-flared section 108 of the braided tubular structure 4. Herein, the one or more rollers 18 may be moved in the same direction as depicted in FIG. 1 or in the opposite direction.

Optionally, the above adjusting step and rolling step may be repeated until a length 112 (see FIG. 6) and/or degree of flaring at the end section 2 of the braided tubular structure 4 satisfactorily meets the required specifications of the respective application.

FIG. 6 shows an alternative embodiment of the inventive method, wherein the end section 2 of the braided tubular structure 4 may be flared over the length 112 by moving each roller 18 in an axial direction 86 with respect to the braided tubular structure 4 during the above rolling step. Thus, each roller 18 follows a spiral or helicoidal path 104 with respect to the braided tubular structure 4.

It should be appreciated by those skilled in this art that the above embodiments are intended to be illustrative, and many modifications may be made to the above embodiments by those skilled in this art, and various structures described in various embodiments may be freely combined with each other without conflicting in configuration or principle.

Although the present disclosure have been described hereinbefore in detail with reference to the attached drawings, it should be appreciated that the disclosed embodiments in the attached drawings are intended to illustrate the preferred embodiments of the present disclosure by way of example, and should not be construed as limitation to the present disclosure.

Although several exemplary embodiments have been shown and described, it would be appreciated by those skilled in the art that various changes or modifications may be made to these embodiments without departing from the principles and spirit of the invention, the scope of which is defined by the claims and their equivalents.

It should be noted that, the word "comprise" doesn't exclude other elements or steps, and the word "a" or "an" doesn't exclude more than one. In addition, any reference numerals in the claims should not be interpreted as the limitation to the scope of the present disclosure.

What is claimed is:

1. A device for flaring an end section of a braided tubular structure of an electrical conductor, comprising:
   a reception volume having a peripheral boundary and adapted to receive the end section of the braided tubular structure; and
   one or more rotatable rollers of which each has at least one convexly formed peripheral roller surface facing the peripheral boundary of the reception volume and having an equatorial line extending on a plane perpendicular to a roller axle, the one or more rollers adapted to move in a peripheral direction about the reception volume.

2. The device according to claim 1, wherein each of the one or more rollers has the roller axle extending coaxially with an axis of symmetry of the respective roller, each of the one or more rollers adapted to rotate about its roller axle.

3. The device according to claim 2, wherein the at least one peripheral roller surface of each of the one or more rollers extends about the respective roller axle.

4. The device according to claim 3, wherein each of the one or more rollers is adapted to revolve around the reception volume about an axis of revolution extending through the reception volume.

5. The device according to claim 4, wherein each of the one or more rollers is spaced apart from the axis of revolution.

6. The device according to claim 5, wherein the axis of revolution is parallel to the roller axle of each of the one or more rollers.

7. The device according to claim 4, wherein the peripheral boundary of the reception volume coincides with the outer circumferential surface of the braided tubular structure.

8. The device according to claim 7, wherein the one or more rollers are adapted to move in a peripheral direction about the outer circumferential surface of the braided tubular structure.

9. The device according to claim 8, wherein the one or more rollers are adapted to apply minimal to no force on the outer circumferential surface of the braided tubular structure.

10. The device according to claim 1, wherein the device includes two or more rollers arranged on opposite sides with respect to the reception volume.

11. The device according to claim 1, wherein the device includes three or more rollers distributed in a circular arrangement around the reception volume.

12. The device according to claim 11, wherein at least two rollers are held at an adjustable distance from one another.

13. The device according to claim 1, wherein at least one roller is adapted to move in a radial direction with respect to the reception volume.

14. The device according to claim 1, further comprising a rotational drive adapted to move each of the one or more rollers in the peripheral direction about the reception volume.

15. The device according to claim 14, further comprising a displacement mechanism for guiding a relative movement between the reception volume and each of the one or more rollers.

16. The device according to claim 15, wherein the displacement mechanism includes a linear drive adapted to move each of the one or more rollers relative to the reception volume.

17. The device according to claim 16, wherein the device is adapted to simultaneously move each of the one or more rollers in the peripheral direction about the reception volume and in an axial direction with respect to the reception volume.

18. The device according to claim 17, wherein the device is adapted to move each of the one or more rollers along a helicoidal path around the reception volume.

* * * * *